No. 686,372. Patented Nov. 12, 1901.
L. E. WATERMAN.
LIFTING LEVER.
(Application filed Oct. 13, 1900.)
(No Model.)

Witnesses:
E. Behel.
J. P. Taylor

Inventor:
Lewis E. Waterman
By A. O. Behel
Atty

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS.

LIFTING-LEVER.

SPECIFICATION forming part of Letters Patent No. 686,372, dated November 12, 1901.

Application filed October 13, 1900. Serial No. 32,937. (No model.)

*To all whom it may concern:*

Be it known that I, LEWIS E. WATERMAN, a citizen of the United States, residing at Rockford, in the county of Winnebago and State of Illinois, have invented certain new and useful Improvements in Lifting-Levers, of which the following is a specification.

The object of this invention is to construct a lever for general purposes in which the lever is locked against movement in both directions when stationary, but adapted to be moved in either direction.

Figure 1:
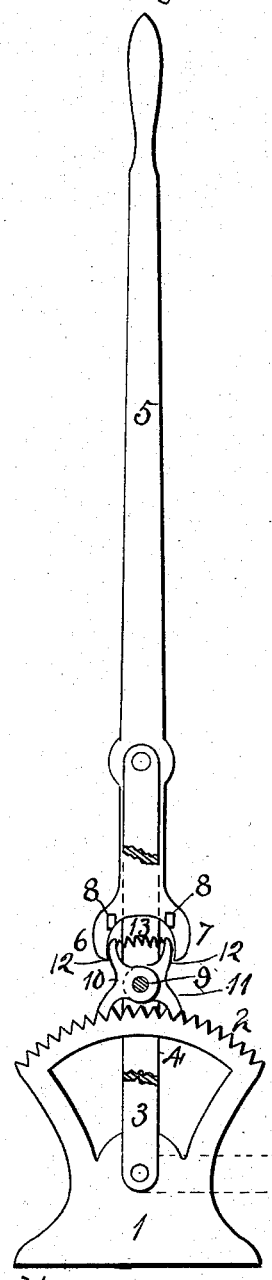
Figure 2:
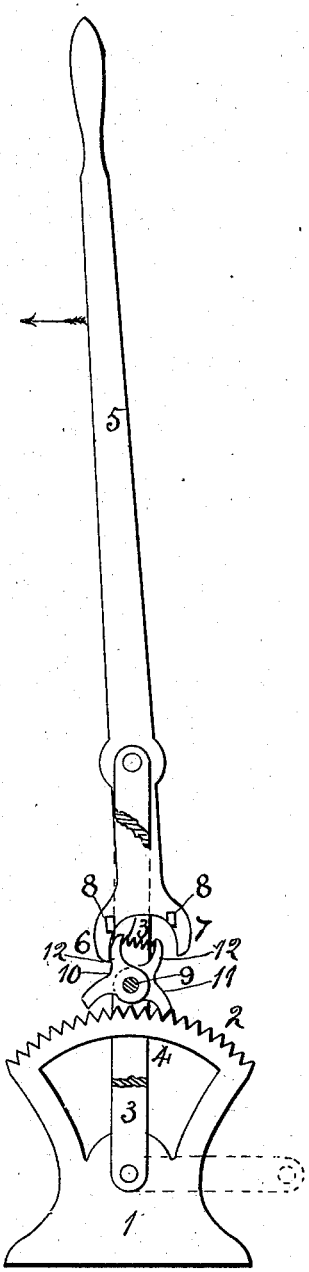
Figure 3:
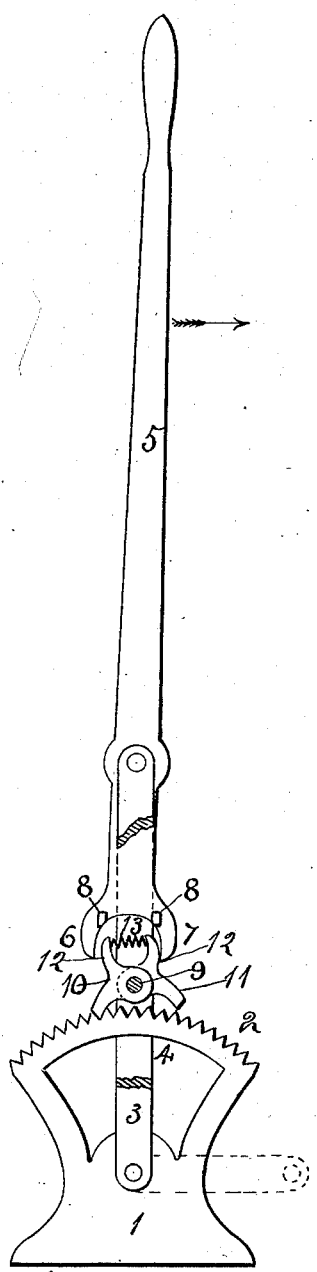

In the accompanying drawings, Figure 1 is a side elevation showing the parts locked in position. Figs. 2 and 3 are side elevations showing the position of the parts when about to be moved to either end of the toothed segment.

The segment 1 has a base of any conformation, and the teeth 2 are of $\wedge$ form, the angle being the same on both sides. To the segment are pivoted bars 3 and 4, one located on each side, and between them is pivoted a hand-lever 5. The end of this hand-lever located between bars 3 and 4 has extensions 6 and 7 and lateral projections 8. The distance between the lateral projections of the two extensions is greater than the width of the side bars 3 and 4.

Between the side bars 3 and 4 is secured a stud 9, upon which are pivoted two dogs 10 and 11, each having an extension 12, and their other ends are formed to fit between the teeth of the segment. The extensions 12 support a coiled spring 13, which is located between them and holds the extensions separated and the other ends of the dogs in engagement with the teeth of the segment. The extensions 6 and 7 of the hand-lever engage the extensions 12 of the dogs. When the parts are in position shown in Fig. 1, both dogs are in engagement with the teeth of the segment and the hand-lever locked against movement in either direction. By moving the hand-lever into the position shown at Fig. 2 the extension 6 of the hand-lever will press on the extension 12 of the dog 10 against the action of the spring and force the dog out of engagement with the teeth of the segment, when the hand-lever can be moved in the direction in which it is pressed. The dog 11 will drag over on the teeth of the segment and prevent the lever from moving in the opposite direction. When the hand-lever is moved in the opposite direction, as shown at Fig. 3, it moves upon its pivotal connection with the bars 3 and 4, and the extension 7 presses upon the extension 12 of the dog 11 against the action of the spring, thereby releasing the dog from its engagement with the segment 1, when the projection 8 will come in contact with the bars 3 and 4, limiting the independent movement of the hand-lever, and a further movement of the hand-lever will move the side bars and both dogs, the dog 10 riding over the teeth of the segment. The side bars 3 and 4 may be extended or a connection made with the side bars above their pivotal connection with the segment with any appliance which can be controlled by a hand-lever, and the lever is unlocked and moved by the same movement in either direction. This hand-lever is especially adapted to agricultural implements; but it is evident that there are various other uses to which it can be applied without departing from the scope of my invention, and the manner of forming the connections with the hand-lever is immaterial.

I claim as my invention—

The combination of a toothed segment, two side plates having a pivotal connection with the segment, a hand-lever having a pivotal connection with the side plates, two dogs pivoted upon a common center, a spring connecting the dogs, the hand-lever provided with a bifurcated extension the arms of which engage the dogs and each provided with a stop adapted to engage a side plate.

LEWIS E. WATERMAN.

Witnesses:
A. O. BEHEL,
E. BEHEL.